Feb. 8, 1927.
H. H. HOWELL
1,616,625
CLIP
Original Filed Oct. 11, 1922
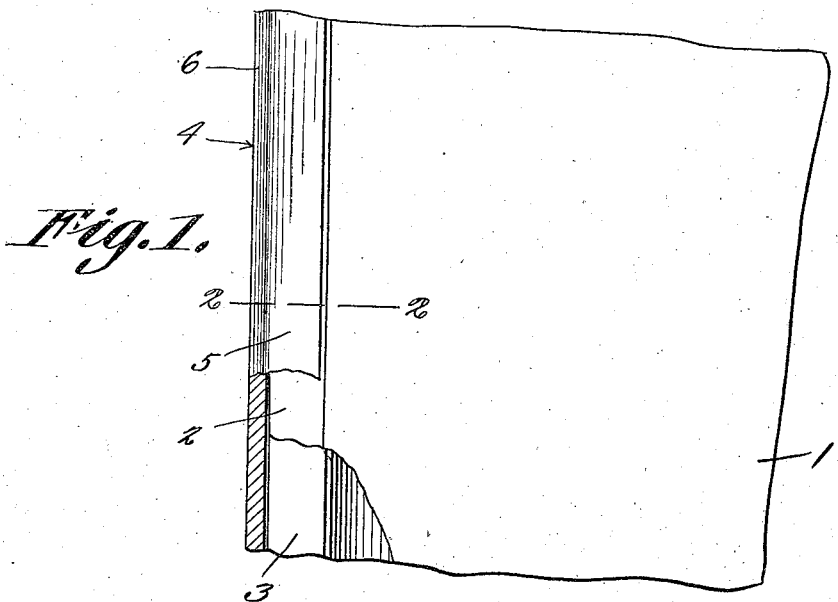
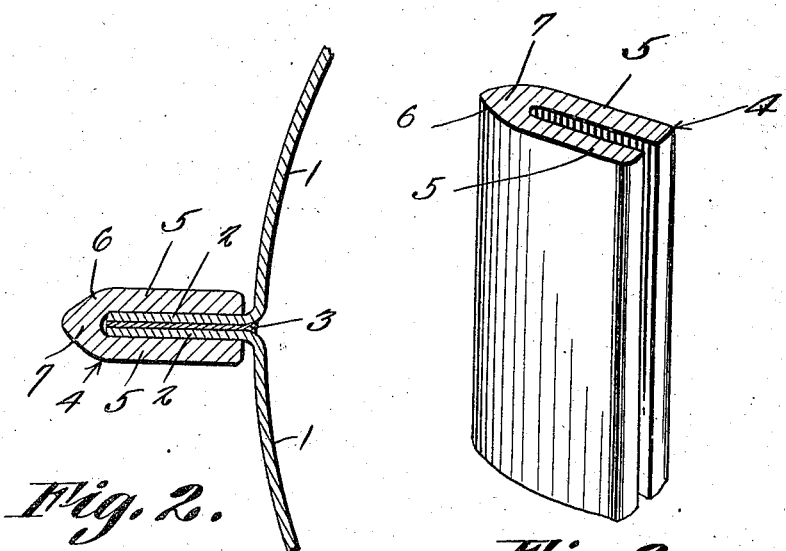
Inventor
H. H. Howell
By C. A. Snow & Co.
Attorneys.

Patented Feb. 8, 1927.

1,616,625

UNITED STATES PATENT OFFICE.

HARRY HAMMOND HOWELL, OF HOPE, ARKANSAS.

CLIP.

Application filed October 11, 1922, Serial No. 593,759. Renewed November 19, 1926.

This invention aims to provide a simple means whereby the flanges on a tank or like structure may be held together so as to afford a hermetic joint between the flanges, a clip of novel outline being provided, for the purpose specified.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a portion of a tank whereunto the device forming the subject matter of this application has been applied; Figure 2 is a section on the line 2—2 of Figure 1; and Figure 3 is a perspective view showing the clip.

In the accompanying drawings, the numeral 1 marks portions of the wall of a metallic tank, the said portion of the wall having projecting flanges 2, between which is located a packing 3, which, preferably is made of lead, although the packing may be of any desired substance.

The numeral 4 designates a U-shaped metal clip which may be of any desired length depending upon the length of the joint which is to be secured. The clip 4 embodies approximately parallel arms 5 merging into a wedge-shaped head 6, the head being thicker in its intermediate portion than are the arms 5 as designated by the numeral 7 in Figure 2.

When the clip 4 is pressed into place, the flanges 2 of the portions 1 of the tank are received between the arms 5 of the clip, the packing 3 being compressed, and a tight joint resulting.

What is claimed is:—

As an article of manufacture, a metallic clip of U-shape and comprising arms, the inner and outer surfaces of which are plane and parallel, and a wedge-shaped head connecting the arms and terminating at its outer end in a pronounced edge disposed symmetrically with respect to the arms, the thickness of the head, measured inwardly from said edge in a direction parallel to the arms, being greater than the thickness of either arm at all points in the length of either arm.

In testimony that I claim the foregoing as my own, I have hereto affixed my signature.

HARRY HAMMOND HOWELL.